United States Patent [19]

Hungerink et al.

[11] Patent Number: 5,861,802
[45] Date of Patent: Jan. 19, 1999

[54] FIFTH WHEEL HITCH COUPLING CONTROL SYSTEM

[75] Inventors: Gerald W. Hungerink, Holland; John P. Heeb, Fennville; Ronald D. Ingraham, Reed City, all of Mich.

[73] Assignee: Holland Hitch Company, Holland, Mich.

[21] Appl. No.: 903,240

[22] Filed: Jul. 24, 1997

Related U.S. Application Data

[63] Continuation of Ser. No. 610,362, Mar. 4, 1996, abandoned.
[51] Int. Cl.⁶ .................................................. G08B 21/00
[52] U.S. Cl. ....................... 340/431; 340/686.2; 307/9.1; 280/433; 280/477; 280/DIG. 14
[58] Field of Search ................................ 340/431, 686.2, 340/687; 307/9.1; 280/DIG. 14, 186, 433, 441, 446.1, 477

[56] References Cited

U.S. PATENT DOCUMENTS

| | | | |
|---|---|---|---|
| 2,982,566 | 5/1961 | Geerds | 280/435 |
| 3,013,815 | 12/1961 | Geerds | 280/435 |
| 3,535,679 | 10/1970 | Connors | 340/431 |
| 3,640,549 | 2/1972 | Neff et al. | 280/435 |
| 3,697,974 | 10/1972 | Harris et al. | 340/431 |
| 3,868,127 | 2/1975 | Marulic et al. | 280/434 |
| 4,428,595 | 1/1984 | Martin et al. | 280/435 |
| 4,614,355 | 9/1986 | Koch | 280/477 |
| 4,649,369 | 3/1987 | Walker et al. | 340/431 |
| 4,669,748 | 6/1987 | LeVee | 280/423.1 |
| 5,108,123 | 4/1992 | Rubenzik | 340/687 |
| 5,456,484 | 10/1995 | Fontaine | 280/434 |
| 5,477,207 | 12/1995 | Frame, Sr. et al. | 340/431 |

FOREIGN PATENT DOCUMENTS

| | | |
|---|---|---|
| 3018905 | 11/1980 | Germany . |
| 3604185 | 8/1987 | Germany . |
| 3803931 | 8/1989 | Germany . |
| 4013672 | 10/1991 | Germany . |

OTHER PUBLICATIONS

Dieter Raab, "Remote Control of Fifth Wheel Couplings", Truck Technology International, 1990.
Advertisement dated Nov. 1991, p. 151.

*Primary Examiner*—Daniel J. Wu
*Attorney, Agent, or Firm*—Price, Heneveld, Cooper, DeWitt & Litton

[57] ABSTRACT

An electronic coupling control system for a vehicle trailer hitch assembly having a hitch plate in which a throat is defined for receiving a trailer kingpin and having a locking mechanism for locking the kingpin in the hitch throat. The electronic coupling control system includes a trailer proximity sensor for sensing when a trailer is in proximity to the hitch assembly, a kingpin sensor for sensing the presence of the kingpin in the hitch throat, a lock sensor for sensing when said locking mechanism is in a locked and secured position, and indicator means located in the vehicle for providing hitch coupling status information to an operator of the vehicle. The indicator means is coupled to the trailer proximity, kingpin, and lock sensors for informing the operator when a trailer is in proximity to the hitch assembly, when the kingpin is positioned in the hitch throat, and when the locking mechanism is in a locked position. The indicator means may include an indicator light and control circuit. The electronic coupling control system may further include an interface for coupling to a control input of an electrical control system of the vehicle, wherein the control circuit is coupled to the interface for generating and providing a control signal to the vehicle electrical control system when the locking mechanism is not in a locked position such that a vehicle function, such as the vehicle's brakes are operated. The electronic coupling control system may also perform a self-diagnostic routine to insure proper operation of its components when the vehicle ignition is turned ON.

22 Claims, 5 Drawing Sheets

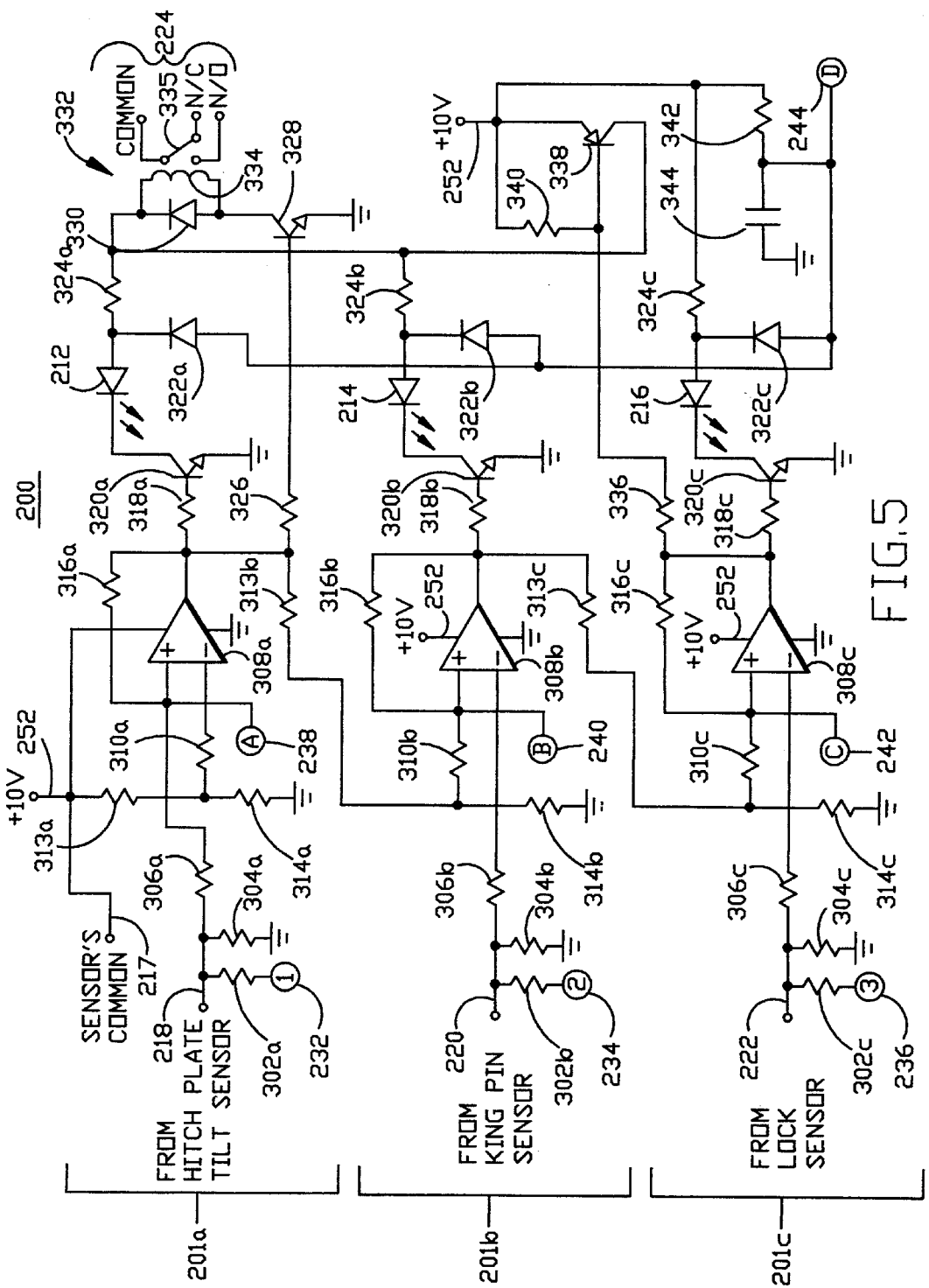

FIFTH WHEEL HITCH COUPLING CONTROL SYSTEM

This is a continuation of application Ser. No. 08/610,362 filed on Mar. 4, 1996, now abandoned.

BACKGROUND OF THE INVENTION

The present invention generally relates to an electronic hitch coupling control system. More particularly, the present invention relates to an electronic system for controlling a coupling system of a fifth wheel trailer hitch and providing status information relating to coupling status of the hitch.

Conventionally, fifth wheel type trailer hitches provided no form of feedback to the operator in a driving position that indicates whether the kingpin of the trailer was securely positioned within the throat of the hitch plate. Thus, it was necessary for the operator to get out of the cab and visually inspect the hitch to determine whether the kingpin was properly positioned in the throat and that the locking mechanism that locks the kingpin in place is in a locked and secure position. In an attempt to solve this problem, a proximity sensor was provided to determine when the locking mechanism is in a locked position and a visual indictor was provided in the cab to let the operator know when the trailer was securely coupled to the hitch without requiring the operator to leave the cab. An example of such a system is disclosed in U.S. Pat. No. 5,477,207, entitled WARNING DEVICE FOR A VEHICLE AND TRAILER COUPLING SYSTEM, issued to Frame, Sr. et al. Despite the additional information such a system provides to the vehicle operator, the information cannot be relied upon if the electrical system is damaged by a broken or short circuit. Additionally, this system does not provide an operator with other useful information that exists prior to the movement of the locking mechanism into a locked position, such as the proximity of the trailer to the hitch assembly. Further, such a system does not require proper coupling and locking before the truck is driven forward and subsequently driven at high speeds on public roadways. Thus, a need exists for an electronic control coupling system that reliably provides additional information to a vehicle operator while coupling the vehicle to a trailer and that prevents normal operation of the vehicle if the trailer is not properly coupled.

SUMMARY OF THE INVENTION

Accordingly, the present invention has been made to overcome the above problems. One aspect of the present invention is to provide an electronic coupling control system that reliably informs the vehicle operator when the trailer's kingpin is positioned in the throat of the hitch plate and when the locking mechanism is in a locked and secured position. Yet another aspect of the present invention is to provide an electronic coupling control system that reliably informs the vehicle operator when the trailer is in proximity to the hitch assembly. Another aspect of the present invention is to provide an electronic coupling control system that reliably informs the vehicle operator when the hitch plate is moved from a resting position, which would occur when the trailer is in proximity to the hitch assembly. Another aspect of the present invention is to provide an electronic coupling control system that performs a self-diagnostic routine each time the vehicle ignition is turned ON. Still another aspect of the present invention is to provide an electronic coupling control system that controls a vehicle function, such as controlling the top speed of the vehicle or operating the vehicle brakes, when the locking mechanism of the hitch is not in a locked and secured position. Additional features and advantages of the invention will be set forth in part in the description which follows and in part will be apparent from the description, or may be learned by practice of the invention.

To achieve these and other advantages, and in accordance with the purpose of the invention as embodied and broadly described herein, the electronic coupling control system of the present invention, which is useful for a vehicle trailer hitch assembly having a hitch plate in which a throat is defined for receiving a trailer kingpin and having a locking mechanism for securing the kingpin in the throat, includes a trailer proximity sensor for sensing when a trailer is in proximity to the hitch assembly, a kingpin sensor for sensing the presence of the kingpin in the throat, a lock sensor for sensing when the locking mechanism is in a locked and secured position, and indicator means located in the vehicle for providing hitch coupling status information to an operator of the vehicle. The indicator means is coupled to the hitch plate movement sensor for informing the operator when the trailer is in proximity to the hitch assembly. The indicator means is also coupled to the kingpin sensor for informing the operator when the kingpin is positioned in the throat. The indicator means is further coupled to the lock sensor for informing the operator when the locking mechanism is in a locked position. The indicator means may include an indicator light and control circuit coupled between the indicator light and the hitch plate movement, kingpin, and lock sensors. The electronic coupling control system may further include an interface for coupling to a control input of an electrical control system of the vehicle, wherein the control circuit is coupled to the interface for generating and providing a control signal to the vehicle electrical control system when the system is active and the locking mechanism is not in a locked position such that a vehicle function is affected. The electronic coupling control system may also include a diagnostic circuit for performing a diagnostic routine to insure proper operation of the trailer proximity, kingpin, and lock sensors, the indicator light, and the control circuit when the vehicle ignition is turned ON.

The features and advantages of the invention may be realized and obtained by means of the instrumentalities and combinations particularly pointed out in the written description and claims hereof, as well as the appended drawings.

BRIEF DESCRIPTION OF THE DRAWINGS

The accompanying drawings, which are incorporated in, and constitute a part of, this Specification illustrate several embodiments of the invention and together with the description, serve to explain the objects, advantages, and principles of the invention. In the drawings:

FIG. 5 is an electrical schematic diagram illustrating an exemplary indicating means of the present invention;

DETAILED DESCRIPTION OF PREFERRED EMBODIMENT

Figure 1:
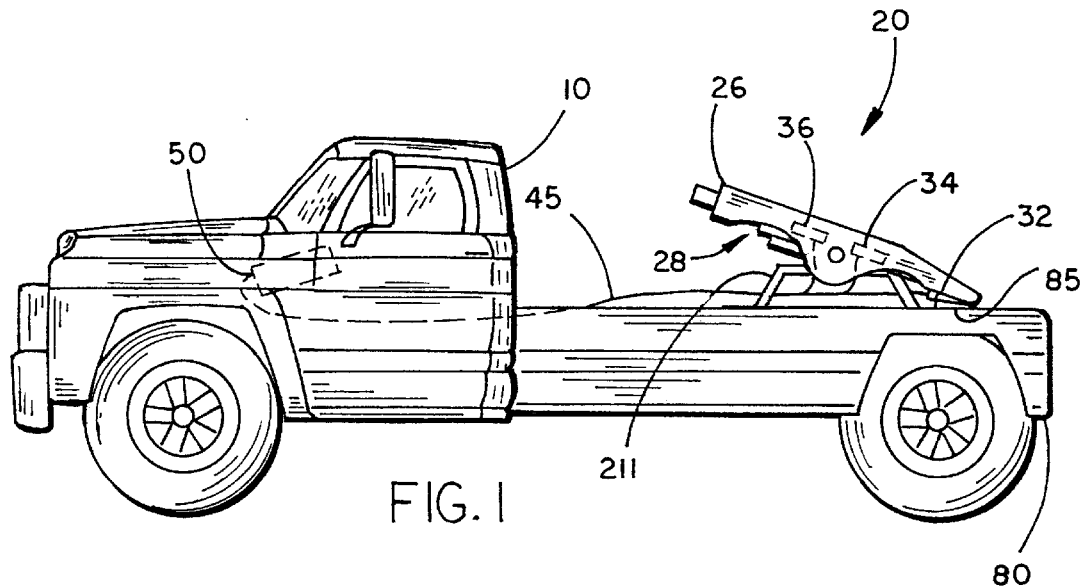
FIG. 1 is a pictorial drawing illustrating the application of the present invention to a truck tractor.

The basic application of the present invention to a truck tractor 10 is illustrated in FIG. 1. Tractor 10 includes a hitch assembly 20 having a base 24 securely mounted on the chassis 80, a hitch plate 26 pivotally mounted on base 24 on a transverse axis, and a locking mechanism 28 for locking a conventional trailer kingpin in place. The electronic coupling control system of the present invention preferably includes three proximity sensors mounted to hitch assembly 20, and a status indicating device 50 mounted in the cab of tractor 10, whereby the sensors are coupled to status indicating device 50 by a cable 45. Preferably, the three sensors mounted to hitch assembly 20 include a trailer proximity sensor, such as a hitch plate movement sensor 32, a kingpin sensor 34, and a lock sensor 36. Sensors 32, 34, and 36 may be non-contact inductive sensors, such as type no. NJS-186K-N available from Pepperl & Fuchs. The manner in which sensors 32, 34, and 36 are mounted to hitch assembly 20 will now be described in detail with reference to FIGS. 2A–C. Although sensor 32 is described hereinafter as a hitch plate movement sensor, this sensor could be mounted in other locations so long as the sensor still detects the proximity of the trailer to the hitch assembly prior to the time that the kingpin is positioned in the throat of the hitch plate.

Figure 2B:
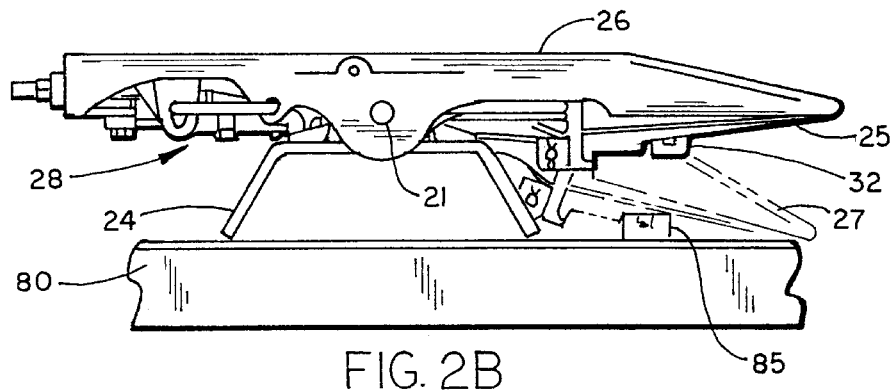
FIG. 2B is another side view of the hitch assembly shown in FIG. 2A in both an at-rest position and a coupled position in combination with its base member.
Figure 2A:
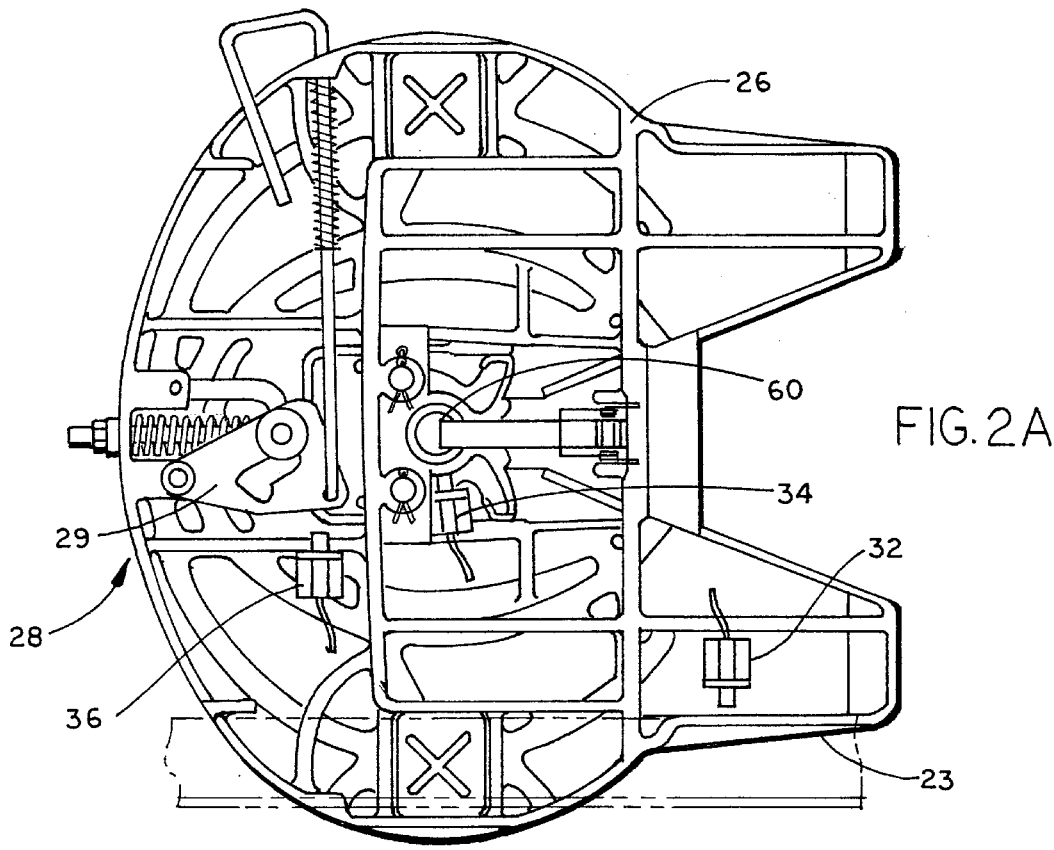
FIG. 2A is bottom view of a hitch assembly constructed in accordance with the present invention.
Figure 2C:
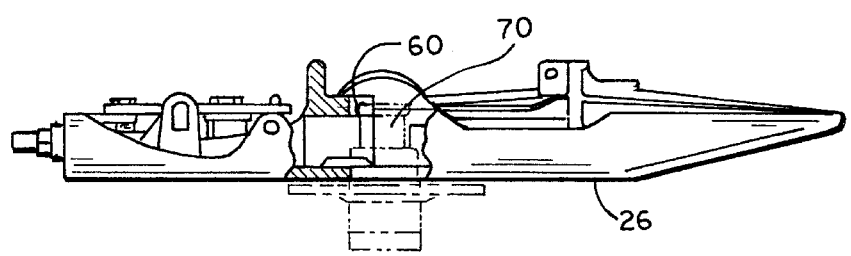
FIG. 2C is side view in partial cross-section of the hitch assembly shown in FIG. 2A.

A more detailed view of hitch assembly 20 is shown in FIGS. 2A–2C. FIG. 2A shows a bottom view of an exemplary hitch plate 26. In a preferred embodiment, hitch plate movement sensor 32 is mounted on a flange 23 of hitch plate 26 such that the sensing end faces outward in a direction perpendicular to the pivot pins 21 (FIG. 2B). FIG. 2B shows the hitch plate 26 from the side in combination with base 24 in a coupled horizontal position 25 and in an uncoupled at-rest position 27 (dashed lines). By mounting a metal plate 85 on chassis 80 in a position near where the sensing end of sensor 32 is disposed when hitch plate 26 is in the resting position, hitch plate movement sensor 32 detects the presence of plate 85 as a basis for determining that the hitch plate is in a tilted at-rest position. When a tractor is backed under a trailer, contact is made between the tilted hitch plate and a portion of the trailer. This contact causes hitch plate 26 to rotate into a coupled position. When sensor 32 subsequently detects the absence of plate 85, it can be concluded that hitch plate 26 has been moved from its at-rest position and that the trailer is in proximity to the hitch assembly. It should be noted that sensor 32 may also be mounted so as to detect metal when hitch plate 26 is in the horizontal coupled position.

Referring back to FIG. 2A, kingpin sensor 34 is mounted to hitch plate 26 with its sensing end near the throat 60 formed in hitch plate 26 into which a trailer kingpin is positioned and locked. FIG. 2C shows an upside-down side view in partial cross section illustrating the location of a trailer kingpin 70 when properly disposed in throat 60. As constructed, kingpin sensor 34 outputs a detection signal when the metal trailer kingpin's lower flange is disposed in throat 60.

Hitch plate assembly 20 further includes a locking mechanism 28 that is biased by compression springs to automatically lock in and secure the trailer kingpin as soon as it enters the hitch throat. In the example shown in FIG. 2A, lock sensor 36 is mounted on hitch plate 26 such that its sensing end is in a position proximate to a position that a metal plate 29 of locking mechanism 28 is in when in a locked position. In this manner, lock sensor 36 detects the presence of plate 29 as a basis for detecting that the locking mechanism is in a locked and secured position. Although a particular locking mechanism is illustrated in FIG. 2A, it will be appreciated by those skilled in the art, that the present invention may be used in connection with any type of locking mechanism. It should also be noted that the present invention may be applied to hitch assemblies having other constructions and is not limited to the particular mounting locations shown for the sensors.

Figure 3:
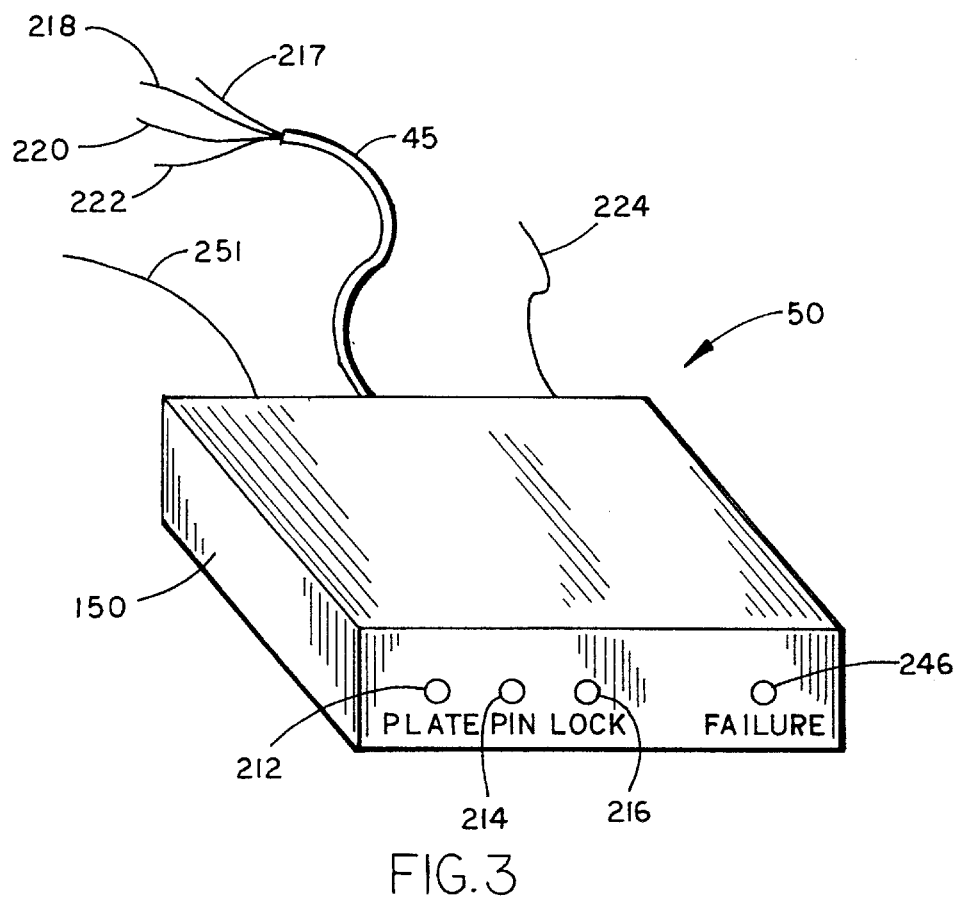
FIG. 3 is an isometric view of a status indicating device constructed in accordance with the present invention.

The outer appearance of status indicating device 50 is shown in FIG. 3. As shown, status indicating device 50 includes an outer housing 150 having four indicator lights, such as light emitting diodes (LEDs). These indicator lights include a hitch plate movement indicator light 212, a kingpin indicator light 214, a lock indicator light 216, and system failure indicator light 246. In a preferred embodiment, hitch plate movement indicator light 212 is a yellow LED, kingpin indicator light 214 is a red LED, lock indicator light 216 is a green LED, and system failure indicator light 246 is a red LED, however other colors may be used. As will be described in more detail below, connecting cable 45 consists of four connecting lines including line 217 for connecting to the common terminals of sensors 32, 34, and 36, line 218 for coupling to hitch plate movement sensor 32, line 220 for coupling to kingpin sensor 34, and line 222 for coupling to lock sensor 36. Status indicating device 50 is also coupled to the vehicle's power supply, and preferably to the vehicle's ignition, via line 251. Additionally, status indicating device 50 may be connected to the tractor's electrical control system via line 224.

When tractor 10 is backed under a trailer, the engagement of the fifth wheel beneath the conventional slide plate around the kingpin depending from the trailer causes hitch plate 26 to move from an uncoupled at-rest position to a horizontal coupled position. When this occurs, hitch plate movement sensor 32 detects this occurrence and therefore the proximity of the trailer, which causes status indicating device 50 to turn on the yellow indicator light 212 associated with the hitch plate. At this same time a control signal may be output on line 224 to the vehicle's electrical control system in order to affect the operation of a vehicle accessory or the vehicle itself, such as restricting the engine speed. When the kingpin of the trailer is properly positioned in the throat of hitch plate 26, kingpin sensor 34 outputs a signal to status indicating device 50, which causes a red indicator light 214 associated with the kingpin to illuminate and to continue to generate the control signal to the tractor's electrical control system via line 224. Once the kingpin is properly positioned in the throat of hitch plate 26, locking mechanism 28 moves into a locked position which is detected by lock sensor 36. Upon detecting this locked position, lock sensor 36 signals status indicating device 50, which extinguishes the yellow and red lights 212 and 214, illuminates a green light 216 associated with the lock sensor, and discontinues the supply of the control signal on line 224 so that the vehicle may operate in a normal mode of operation. In normal operation, the kingpin sensor and lock sensor output signals are activated virtually simultaneously, such that red light 214 merely blinks for an instant. However, by providing two separate lights for the kingpin sensor and the locking mechanism sensor, the vehicle operator can determine whether the locking mechanism is functioning properly provided, of course, the electronic coupling control system is operating properly.

Figure 4:
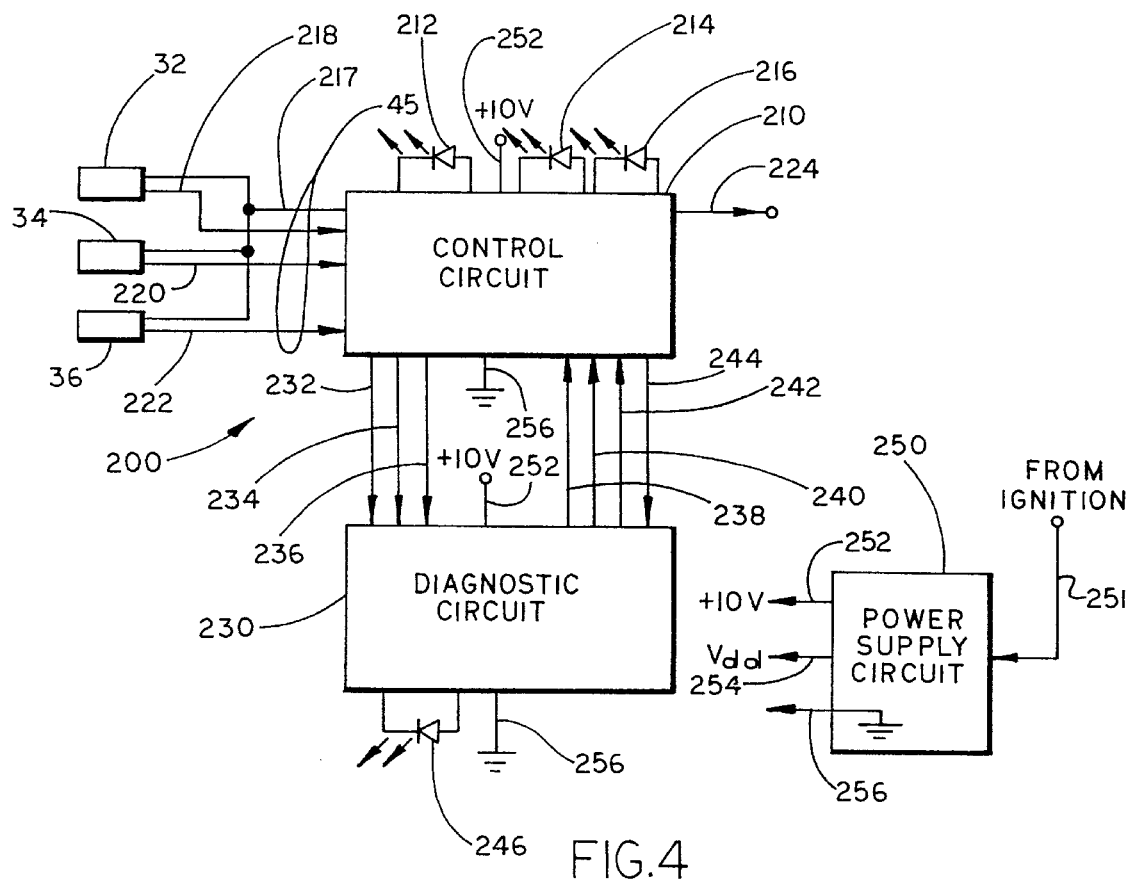
FIG. 4 is a block diagram of an electronic circuit constructed in accordance with the present invention.

The electronic coupling control system circuitry will now be described with reference to FIGS. 4–7. As shown in FIG. 4, the electronic coupling control system circuitry includes indicating means 200, which is comprised of control circuit 210 and LEDs 212, 214, and 216, diagnostic circuit 230, which is connected to system failure indicator LED 246, and a power supply circuit 250. As will be described in more detail below, control circuit 210 receives the outputs of sensors 32, 34, and 36 via lines 218, 220, and 222, respectively, and selectively lights LEDs 212, 214, 216 in response to the sensor outputs. Additionally, control circuit 210 may output a control signal to the tractor's electrical control system via line 224 in response to the sensor outputs. Diagnostic circuit 230 is coupled to control circuit 210 via lines 232, 234, 236, 238, 242, and 244 to monitor the output signal levels of sensors 218, 220, and 222 as well as the outputs of control circuit 210 via line 244, in order to determine whether the electronic coupling control system is operating properly. If the system is not operating properly, diagnostic circuit 230 causes system failure LED 246 to rapidly blink thereby informing the vehicle operator of a system failure. As will be explained below, a service technician may easily determine where a failure has occurred based upon the sequence and combination in which indicator lights 212, 214, 216, and 246 are illuminated.

Power supply circuit 250 is coupled to receive power from the tractor's ignition via line 251 and provides a 10 volt output to control circuit 210 and diagnostic circuit 230 via line 252. Preferably, power supply circuit 250 also provides a ground reference to control circuit 210 and diagnostic circuit 230 via line 256 and a positive voltage level sufficient to power integrated circuits within control circuit 210 and diagnostic circuit 230 via line 254. Although power supply circuit 250 may be constructed in any conventional manner sufficient to convert power from a vehicle's ignition into the required voltages for control circuit 210 and diagnostic circuit 230, a preferred circuit construction of power supply circuit 250 is described below with reference to FIG. 7 following a detailed description of indicator means 200 with reference to FIG. 5 and of diagnostic circuit 230 with reference to FIG. 6.

As shown in FIG. 4, indicating means 200 includes three sensor amplifier circuits 201a, 201b, and 201c for each respective sensor, as well as output control circuitry. Because the three sensor amplifier circuits 201a, 201b, and 201c are nearly identical in construction, only one of the three sensor amplifier circuits will now be described. For purposes of comparison, components in each of the three sensor amplifier circuits 201a, 201b, and 201c that are identical to one another are identified by the same reference numeral with the exception that the reference numeral is followed by a "a", "b", or "c". Where components in one of the three sensor amplifier circuits differ, different reference numerals are used.

The output signal from hitch plate movement sensor 32 is received by sensor amplifier circuit 201a via line 218. This sensor output signal is coupled to ground via a resistor 304a, which preferably has a resistance of 2.2 kΩ and is applied to the non-inverting input of an operational amplifier 308a through a resistor 306a, which preferably has a resistance of 10 kΩ and provides input protection against transients. Operational amplifier 308a may be part no. LM2902 available from National Semiconductor and others. The output signal from sensor 32 is also passed through a resistor 302a, which preferably has a resistance of 100 kΩ, to diagnostic circuit 230 via line 232 in order to determine whether the voltage level of the sensor output signal is within acceptable limits. A voltage divider composed of resistor 313a, which preferably has a resistance of 1 kΩ, and a resistor 314a, which preferably has a resistance of 2.7 kΩ, supplies a reference voltage through resistor 310a to the inverting input of operational amplifier 308a. Preferably, resistor 310a is a 10 kΩ resistor. The reference voltage supplied by the voltage divider falls between the 10 volt power supply to which resistor 313a is connected and ground to which resistor 314a is connected. A resistor 316a having a preferred resistance of 100 kΩ is connected between the output of operational amplifier 308a and its non-inverting input in order to provide a positive hysteresis to convert what is basically an analog signal from the sensor to a step-function. To insure proper sensor and circuit operation, diagnostic circuit 230 may enable and disable operational amplifier 308a via line 238.

Hitch plate movement sensor 32 outputs a high voltage when hitch plate is moved from its resting position and a low voltage when hitch plate 26 is in its resting position. Because control circuit 201a illuminates LED 212 when hitch plate 26 is moved from its resting position (when sensor 32 output is high) and because circuits 201b and 201c illuminate LEDs 214 and 216 when sensors 34 and 36 output a low voltage, the sensor outputs from sensors 34 and 36 are applied to the inverting input of operational amplifiers 308b and 308c and the reference voltages are applied to the non-inverting inputs of amplifiers 308b and 308c. If hitch plate movement sensor were positioned so as to output a low voltage when hitch plate 26 were in its horizontal coupled position, the output of sensor 32 would be applied to the inverting input of amplifier 308a and the reference voltage would be applied to the non-inverting input.

The output of operational amplifier 308a is applied to a base of a transistor 230a through a current limiter resistor 318a, which is preferably a 10 kΩ resistor. Transistor 320a, which is preferably part no. MPSA13 available from Motorola Semiconductor and others has its emitter connected to ground and its collector connected to the cathode of hitch plate movement indicator LED 212. Power is supplied to the anode of LED 212 via a transistor 338 and a current limiting resistor 324a, which preferably has a resistance of 680Ω. Transistor 338 is preferably an NPN transistor part no. MPSA56 available from Motorola Semiconductor and others, with its emitter connected to receive the 10 volt power supply via line 252, its collector connected to resistor 324a, and its base coupled to receive the output of the operational amplifier 308c associated with the lock sensor via a resistor 336 preferably having a resistance of 10 kΩ. In this manner, the sensor amplifier circuit associated with the lock sensor may enable or disable the lighting of the hitch plate movement indicator light 212 as well as the kingpin indicator 214. As described above, it is preferable that once the locking mechanism has locked the kingpin in place, the green lock indicator light 216 is illuminated while hitch plate movement indicator light 212 and kingpin indicator light 214 are extinguished. A resistor 340 of preferably 2.2 kΩ is connected between the emitter and base of transistor 338 to properly scale the output voltage of operational amplifier 308c for use by transistor 338.

Lock indicator light 216 is provided power from line 252 through the current limiting resistor 324c. Thus, the supply of power to the lock indicator light 216 is not conditioned upon the output of operational amplifier 308c although lock indicator light 216 is turned on and off by the output of operational amplifier 308c via transistor 230c. Sensor amplifier circuit 201b associated with the kingpin sensor differs from sensor amplifier circuit 201a in that the voltage divider composed of resistors 313b and 314b are connected between ground and the voltage at the output of operational amplifier 308a, rather than the 10 volt power supply on line 252. Thus, as constructed, operational amplifier 308b is enabled only when the output voltage level of operational amplifier 308a is high. Similarly, the voltage divider composed of resistors 313c and 314c in the sensor amplifier circuit 201c associated with the lock sensor, is connected between ground and the output of operational amplifier 308b. Thus, operational amplifier 308c is not enabled until the output of operational amplifier 308b is high. Although the output of sensors 32, 34, and 36 will change in a particular sequence such that the hitch plate movement sensor 32 will detect that the hitch plate has moved from a resting position before the kingpin sensor 34 and the lock sensor 36 have, respectively, detected that the kingpin is in position and the lock mechanism is in a locked position, the sequential enablement of operational amplifiers 308a, 308b, and 308c provides a basis for diagnostic circuit 230 to identify where a failure has occurred.

Control circuit 210 may optionally be provided with a relay circuit 332, which operates as an interface to the vehicle's electrical control system. Preferably relay circuit 332 includes a relay coil 334, a switch 335, a transient-suppression diode 330 connected between the ends of the relay coil 334, and a relay driver transistor 328. Diode 330 is preferably part no. 1N4001 available from Motorola Semiconductor and others and relay driver transistor 328 is preferably a PNP transistor, part no. MPSA13 available from Motorola Semiconductor and others. With its collector connected to one end of relay coil 334, its emitter coupled to ground, and its base connected to the output of the operational amplifier 308a associated with the hitch plate movement sensor 32 via a resistor 326, relay driver transistor 328 connects the relay circuit to ground whenever hitch plate movement sensor 32 determines that the hitch plate 26 has moved from a resting position. Preferably resistor 326 has a resistance of 10 kΩ. The other end of relay coil 334 is coupled to the 10 volt power supply line 252 via transistor 338, which is controlled by the output of the operational amplifier 308c associated with the lock sensor 36. Thus, relay coil 334 is supplied with 10 volts of power until lock sensor 36 determines that the locking mechanism 28 is in a locked position. As connected, relay coil 334 is energized causing switch 334 to switch from a normally open or closed position during the time period beginning when the hitch plate is first detected as being pivoted from a tilted resting position and ending when the lock sensor 36 has detected that the locking mechanism 28 is in the locked position.

The control signal taken from the normally opened or normally closed terminal of relay switch 335 may be applied to the vehicle's electrical system via line 224 in order to affect the functioning of a vehicle accessory or an operation of the vehicle itself. For example, the control signal may be applied to the vehicle's braking system causing the vehicle to slightly apply its brakes. Further, the control signal could be used to illuminate an internal or external light on the vehicle. Other possible ways of affecting the functioning of the vehicle include restricting the maximum allowable speed of the vehicle, preventing the transmission from being shifted into any forward gear higher than first gear, or affecting any other function that would prevent the normal operation of the vehicle in the forward and/or backward direction. By providing this interface to the vehicle's electrical control system, operation of the vehicle while towing an improperly coupled trailer may be prevented without requiring the vehicle operator to look at the indicator lights provided on status indicating device 50.

Diodes 322a–c having their cathodes coupled to the anodes of LEDs 212, 214, and 216, respectively, and having their anodes coupled together and to the 10 volt power supply line 252 via resistor 342, are provided to isolate the LED driver circuits from each other while providing a diagnostic signal voltage to diagnostic circuit 230 via line 244. The anodes of diodes 322a–c are also coupled to ground through a capacitor 344. Preferably, diodes 332a–c are part no. D1N4148 available from Diodes, Inc., resistor 342 has a resistance of 10 kΩ, and capacitor 344 has a capacitance of 0.47 μF.

Line 217, which is connected to the common output of sensors 32, 34, and 36, is connected in control circuit 210 to the 10 volt power supply line 252. In this manner, the sensors, which are of a non-switch variety, always produce an output voltage which is between 10 volts and ground. The sensors output a high voltage level when they are de-energized. In the presence of ferrous metal (i.e., the metal kingpin 70, metal plate 29 of locking mechanism 28, and plate 85), the sensors output a low voltage. By comparing the output of the sensor to reference voltages near 10 volts and ground, diagnostic circuit 230 can determine whether a sensor circuit is shorted or open. Having described the detailed construction of the indicating means 200, the detailed construction of diagnostics circuit 230 will now be described with reference to FIG. 6.

Diagnostic circuit 230 includes a counter 402, which essentially controls the entire diagnostic sequence and is preferably part no. CD4017 available from Harris and others. A clock input to counter 402 is derived from an oscillator 404 built around an operational amplifier 464, which operates at approximately 1 Hz. The output of this same oscillator 404 is used to flash the system failure indicator light 246 when improper or non-operation is sensed during the diagnostic sequence. Counter 402 provides enable signals to operational amplifiers 308a–c of sensor amplifier circuits 201a–c via lines 238, 240, and 242, respectively. The enable signals are output from counter 402 at output terminals Q0, Q1, and Q2 to lines 238, 240, and 242 via diodes 426, 428, and 430, respectively. Preferably diodes 426, 428, and 430 consist of part no. D1N4148 available from Diodes, Inc. The enable signals output from terminals Q0, Q1, and Q2 are also supplied to first inputs of AND gates 414, 416, and 418, respectively, which are preferably part no. CD4081 available from Harris and others. The second inputs of AND gates 414, 416, and 418 are connected together and to the 10 volt power line 212 via a resistor 422 (preferably 10 kΩ) and the outputs thereof are connected to three of four input selection terminals of a multiplexer 432. The fourth input selection terminal of multiplexer 432 is connected to the output of a fourth AND gate 420, which has one input terminal coupled to output terminal Q3 of counter 402 via a resistor 424 (preferably 100 kΩ), and a second input terminal coupled to 10 volt power line 252 via a resistor 421 (preferably 100 kg) and coupled to ground via a capacitor 423 (preferably 0.01 μF).

Multiplexer 432 may include four switching gates 434, 436, 438, and 440, which are preferably part no. CD4066 available from Harris and others, each having a switching control input connected to a respective one of AND gates 414, 416, 418, and 420 so as to function in a combined fashion to output a selected one of the sensor output signals present on lines 218, 220, 222, or the control circuit output on line 244. The output of multiplexer 432 is coupled to ground via a resistor 448 (preferably 1 MΩ) and is applied to a window detector 442 that determines whether the voltage level output from multiplexer 432 is within an acceptable window prescribed by upper and lower voltage thresholds. Window detector 442 includes an upper threshold comparator 444 and a lower threshold comparator 446, which are preferably part no. LM2901 available from National Semiconductor and others. The output from multiplexer 432 is applied to the negative terminal of comparator 444 and to the positive terminal of comparator 446 such that comparator 444 will generate a fault detection signal when the output voltage of one of the sensors or the system that is selected by multiplexer 432 exceeds an upper threshold voltage supplied to its positive terminal from a voltage divider circuit. Similarly, comparator 446 outputs a fault detection signal when the voltage level at the multiplexer 432 output falls below a second voltage threshold provided by the voltage divider circuit composed of resistors 450, 452, and 454. In this voltage divider circuit, resistor 450, which preferably has a resistance of 19 kΩ, is connected between the 10 volt power line 252 and the positive terminal of comparator 444. Resistor 452, which preferably has a resistance of 47 kΩ is connected between the positive terminal of comparator 444 and the negative terminal of comparator 446. Resistor 454, which preferably has a resistance of 2.7 kΩ, is connected between the negative terminal of comparator 446 and the ground.

The outputs of comparator 444 and 446 are both connected to the 10 volt power line 252 through a resistor 456 (preferably 10 kΩ) and to the clock output of oscillator 404 via a diode 463, which is preferably D1N4148 available from Diodes, Inc., and to the anode of a diode 459. Diode 459, which is preferably D1N4148 available from Diodes, Inc., also has the clock output of oscillator 404 applied to its anode via diode 463 and has its cathode connected to the positive terminal of comparator 460 which drives system failure indicator light 246, and coupled to the positive terminal of comparator 458 and the negative terminal of comparator 446 via a resistor 461 (preferably 100 kΩ). Comparator 458 has its negative terminal coupled to output terminal Q3 of counter 402 and its output coupled to the second input terminals AND gates 414, 416, and 418.

In addition to operational amplifier 464, oscillator 404 also includes a voltage divider composed of resistors 466 (preferably 100 kΩ) and resistor 468 (preferably 100 kΩ) connected in series between the 10 volt power line 252 and ground to provide a reference voltage therebetween to the non-inverting input of operational amplifier 464. A resistor 472 which preferably has a resistance of 100 kΩ, is connected between the output and the non-inverting input of operational amplifier 464. The inverting input of operational amplifier 464 is coupled to the output of the operational amplifier through a resistor 474 (preferably 1 MΩ) and is coupled to ground via a capacitor 470 (preferably 0.47 μF). The output of operational amplifier 464 is coupled to the negative input terminal of comparator 460 via resistor 476 (preferably 10 kΩ) and to one end of a resistor 478 (preferably 10 kΩ). The other end of resistor 478 is coupled to ground through a capacitor 480 (preferably 0.01 μF) and provides the 1 Hz oscillator output signal to the clock input terminal of counter 402 and to the anode of diode 459. The output from output terminal Q3 of counter 402 is provided to the inverting terminal of operational amplifier 464 via a diode 488 and to the positive terminal of comparator 460 via diode 490. Diodes 488 and 490 are preferably part no. D1N4148 available from Diodes, Inc. In addition to being connected to the output of operational amplifier 464, the negative input terminal of comparator 460 is connected to ground via a resistor 492, which preferably has a resistance of 10 kΩ. The output of comparator 460 is connected to the cathode of system failure LED 246 to provide a ground connection such that LED 246 will receive power from 10 volt power line 252 via a current limiting resistor 462 (preferably 680Ω) and thereby illuminate.

Diagnostic circuit 230 is further provided with a circuit for selectively setting counter 402. This circuit includes a diode 408 having its cathode connected to the reset terminal of counter 402 and its anode connected to the 10 volt power supply line 252 via a capacitor 406 (preferably 0.01 μF) and connected to ground via a resistor 410 (preferably 100 kΩ). The anode of diode 408 is also coupled to ground via resistor 412, which preferably has a resistance of 1 MΩ. This reset circuitry further includes a diode 486 having its cathode connected to the reset terminal of counter 402 and its anode connected to ground via a resistor 487 (preferably 100 kΩ) and connected to the output AND gate 420 via a capacitor 484 (preferably 0.01 μF). The output of AND gate 420 is coupled to its first input terminal via a diode 482 in order to effectively latch the output of AND gate 420. The reset circuit also connects the enable terminal of counter 402 to ground. Having described the physical structure of the diagnostic circuit 230, a description of its operation will now be provided.

When the vehicle's ignition is turned on, power supply circuit 250 supplies the 10 volt power on line 252 to capacitor 406, which generates a counter reset pulse that is delivered to the reset terminal of counter 402 via diode 408. Initially, all the outputs Q0–Q3 are low, AND gates 414, 416, 418, and 420 are disabled, and the output of comparator 460 is high such that system failure LED 246 is not illuminated. Because the outputs Q0–Q3 of counter 402 are low, the non-inverting terminals of operational amplifiers 308a–c are unaffected. During the diagnostic procedure, LEDs 212, 214, and 216 are sequentially illuminated (via amplifiers 308a–c) as counter 402 steps, thus allowing a technician to determine the location of any failure discovered during the diagnostic procedure since the clock stops when a failure is detected. This diagnostic procedure is still functional even if the trailer is coupled or even partially coupled.

When the vehicle's ignition is turned on and power supply circuit 250 supplies the 10 volt power on line 252, oscillator 404 is powered up and provides a 1 Hz output to the clock terminal of counter 402. When counter 402 receives the first clock pulse from oscillator 404, the output at output terminal Q0 goes high thus actuating sensor amplifier circuit 201a and AND gate 414 thereby causing switch 434 to conduct. With switch 434 conducting, multiplexer 432 applies the output of the hitch plate movement sensor 32 to window detector 422. Window detector 422 then determines whether the output from the hitch plate movement sensor 32 is within the predetermined window (neither open nor shorted). If the output of hitch plate movement sensor 32 is within the window, window detector 422 does not generate a fault detection signal and the next clock pulse from oscillator 404 causes counter 402 to reset its output terminal Q0 low and to set output terminal Q1 high. When output terminal Q1 is set high, amplifier 308b is actuated, and AND gate 416 is enabled thereby causing multiplexer 432 to output the signal supplied from kingpin sensor 34 to window detector 442. If the output of kingpin sensor is within the window, window detector does not output a fault detection signal and counter 402 resets output terminal Q1 low and sets output terminal Q2 high when the next clock pulse is received from oscillator 404. When output terminal Q2 is high, amplifier 308c is actuated, and AND gate 418 is enabled causing multiplexer 432 to supply the output of lock sensor 36 to window detector 442. If the output of lock sensor 36 is within the prescribed window, window detector 442 does not output a fault detection signal and counter 402 resets output terminal Q2 low and sets output terminal Q3 high upon receiving the next clock pulse from oscillator 404 when output terminal Q3 is high AND gate 420 is turned on thereby causing multiplexer 432 to supply the voltage signal on line 244 to the window detector 442. Also, when output terminal Q3 is high, the negative terminal of comparator 458 goes high causing its output to go low thereby disabling AND gates 414, 416, and 418. When AND gate 420 is turned on by output terminal Q3 going high diode 482 causes AND gate 420 to latch in the "on" state and generates a reset pulse via capacitor 484 and diode 486 causing counter 402 to reset all of output terminals Q0–Q3 to low and subsequently enables operational amplifiers 308, 308a, 308b, and 308c in sequence. During this time, AND gate 420 remains enabled due to the latching of diode 482 while diodes 322a–c read the output from the amplifier/LED driver circuits (FIG. 5) the voltages from which are applied via line 244 to window detector 442. If all the voltages are between the upper and lower thresholds, no false detection signal is generated and the next clock pulse from oscillator 404 causes counter 402 to set output terminal Q3 high, which disables oscillator 404 via diode 488 while locking out comparator 460 via diode 490.

Should an error or fault have been detected during any of these tests, window detector 442 would generate a fault detection signal whereby its output goes low. When the output of window detector 442 goes low, the clock signal supplied to counter 402 by oscillator 404 is shorted-out thus stopping counter 402 at whatever state it is in when the fault was discovered. LED driver 460 would then become enabled allowing oscillator 404 to cause LED 246 to blink signifying the presence of a problem. By reading the LED lighting sequence while the diagnostic circuit was stepping, a technician could easily determine what part of what circuit was causing a problem. Thus, normal operation allows the test sequence to progress unimpeded, while a fault condition stops the clock and causes the fault light to begin flashing. The condition LEDs tell a technician where to look for trouble.

Figure 7:
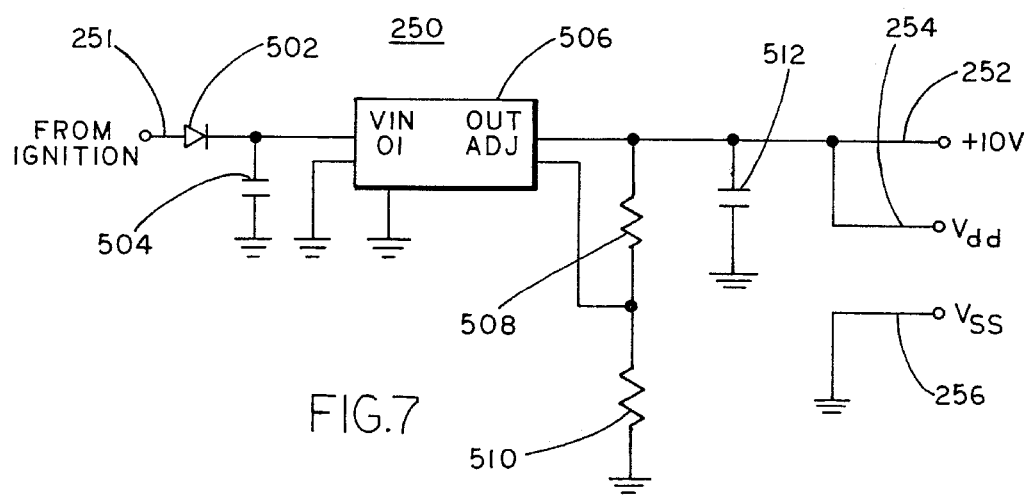
FIG. 7 is an electrical schematic diagram illustrating an exemplary power supply circuit of the present invention.
Figure 6:
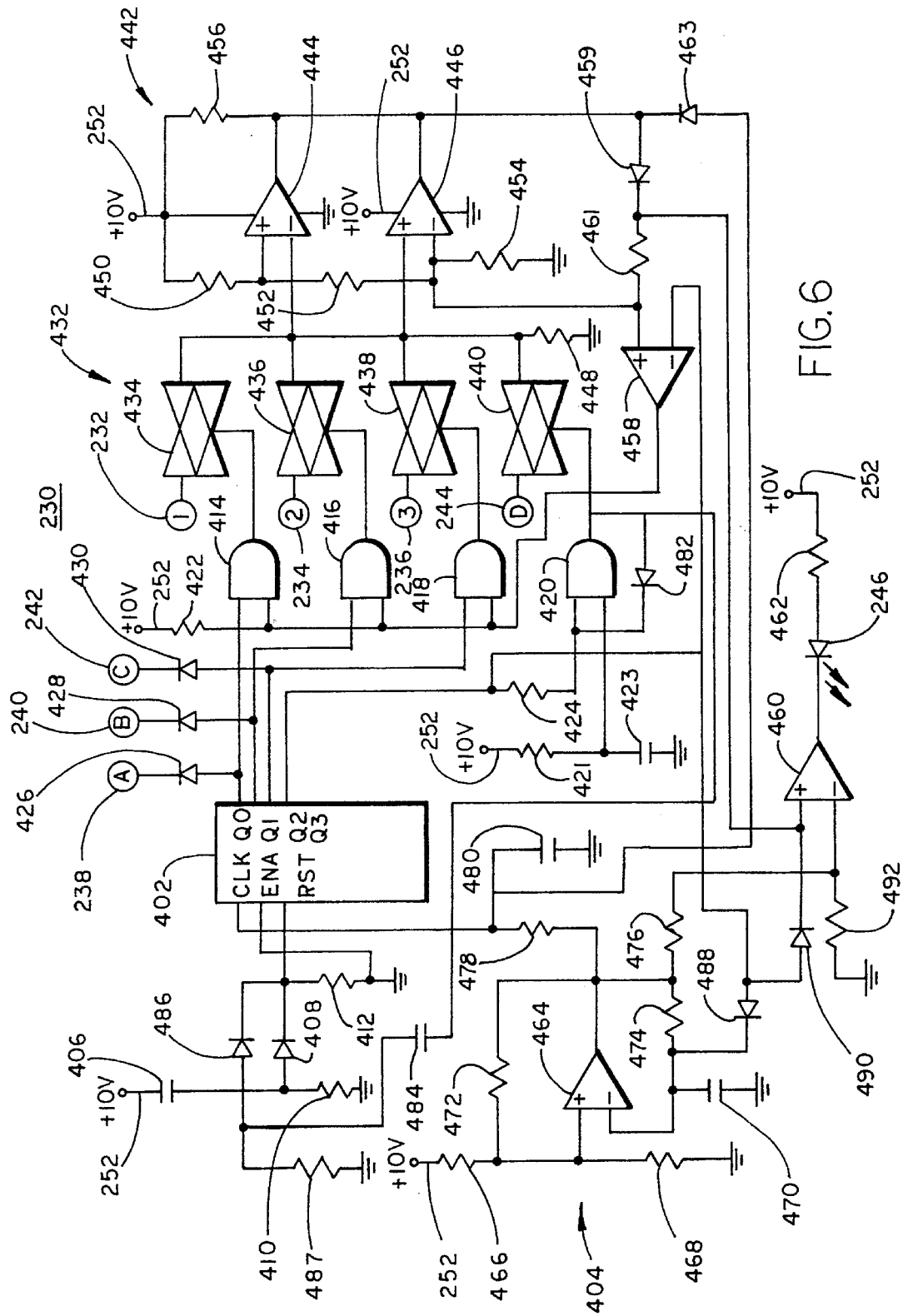
FIG. 6 is an electrical schematic diagram illustrating an exemplary diagnostic circuit of the present invention.

Referring to FIG. 7, a preferred construction of the power supply circuit will now be described. Preferably, power supply circuit 250 is a linear low-dropout regulator with an adjustable output set to nominally 10 volts. Power supply circuit 250 may include a series diode 502 having its anode connected to the vehicle ignition via line 251 and having its cathode connected to ground via a capacitor 504 (preferably 0.047 μF) and to the input terminal of a voltage regulator 506. Preferably, diode 502, which is provided to protect the input against reverse polarity, is part no. 1N4004 available from Motorola Semiconductor and others, and regulator 506 is part no. LM2931CT available from National Semiconductor and others. The output of regulator 506 is coupled to ground via a capacitor 512 (preferably 100 μF) and coupled to a voltage divider composed of a resistor 508 (preferably 28.0 kΩ) and a resistor 510 (preferably 249 kΩ), which provides a reference voltage to the adjustment input terminal of regulator 506. As shown in FIG. 7, the output of regulator 506 is applied to control circuit 210 and diagnostic circuit 230 via line 252 when power is supplied via the vehicle's ignition on line 251. Further, if the active components of the control circuit 210 and diagnostic circuit 230 require a 10 volt operating voltage, the output of regulator 506 may be supplied thereto via line 254 or 252. If, on the other hand, the required operating voltages for these active components is less than 10 volts, additional components may be included in the power supply circuit 250 to supply this separate voltage to the active components via line 254.

The above described embodiment was chosen for purposes of describing but one application of the invention. It will be understood by those who practice the invention and by those skilled in the art, that various modifications and improvements may be made to the invention without departing from the spirit of the disclosed concept. For example, other types of sensors other than proximity sensors may be used to detect the status of the coupling operation. Further, the indicators may be audible alarms rather than, or in addition to, the LEDs used to visually alarm the vehicle operator. The scope of protection afforded is to be determined by the claims and by the breadth of interpretation allowed by law.

The embodiments of the invention in which an exclusive property or privilege is claimed are defined as follows:

1. An electronic coupling control system for a trailer hitch assembly to be located on a vehicle having an electrical control system for controlling a vehicle function in response to a control signal applied to a control input thereof, the trailer hitch assembly having a throat for receiving a trailer kingpin and having a locking mechanism for locking the kingpin in the throat, said electronic coupling control system comprising:

a lock sensor for sensing when said locking mechanism is in a locked position;

an interface for coupling to a control input of said vehicle electrical control system; and a control circuit coupled to said lock sensor and to said interface for generating and providing a control signal to said vehicle electrical control system when said locking mechanism is not in a locked position, wherein the vehicle electrical control system responds to said control signal by affecting a vehicle function, wherein the vehicle electrical control system responds to said control signal by restricting a maximum allowable engine speed of the vehicle.

2. An electronic coupling control system for a trailer hitch assembly to be located on a vehicle having an electrical control system for controlling a vehicle function in response to a control signal applied to a control input thereof, the trailer hitch assembly having a throat for receiving a trailer kingpin and having locking mechanism for locking the kingpin in the throat, said electronic coupling control system comprising:

a lock sensor for sensing when said locking mechanism is in a locked position;

an interface for coupling to a control input of said vehicle electrical control system; and a control circuit coupled to said lock sensor and to said interface for generating and providing a control signal to said vehicle electrical control system when said locking mechanism is not in a locked position, wherein the vehicle electrical control system responds to said control signal by affecting a vehicle function, wherein the vehicle electrical control system responds to said control signal by preventing the transmission of the vehicle from being shifted into a gear above a predetermined gear.

3. An electronic coupling control system for a trailer hitch assembly to be located on a vehicle having an electrical control system for controlling a vehicle function in response to a control signal applied to a control input thereof, the trailer hitch assembly having a throat for receiving a trailer kingpin and having a locking mechanism for locking the kingpin in the throat, said electronic coupling control system comprising:

a lock sensor for sensing when said locking mechanism is in a locked position;

an interface for coupling to a control input of said vehicle electrical control system; and a control circuit coupled to said lock sensor and to said interface for generating and proving a control signal to said vehicle electrical control system when said locking mechanism is not in a locked position, wherein the vehicle electrical control system responds to said control signal by affecting a vehicle function, wherein the vehicle electrical control system responds to said control signal by gently applying the brakes of the vehicle.

4. An electronic coupling control system for a vehicle trailer hitch assembly having a throat for receiving a trailer kingpin and having a locking mechanism for locking the kingpin in the throat, said electronic coupling control system comprising:

a lock sensor for sensing when said locking mechanism is in a locked position;

a trailer proximity sensor for sensing when a trailer is in proximity to said hitch assembly as the hitch assembly approaches the trailer prior to coupling; and indicator means located in the vehicle for providing hitch coupling status information to an operator of the vehicle, said indicator means is coupled to said trailer proximity sensor and is activated to inform the operator when a trailer is in proximity to said hitch assembly, wherein said hitch assembly includes a hitch plate that moves from a resting position prior to coupling to a trailer, and wherein said trailer proximity sensor is a hitch plate movement sensor for detecting when said hitch plate is moved from a resting position, said indicator means further being coupled to said lock sensor for providing a continuous indication to the operator so long as said locking mechanism remains in the locked position.

5. An electronic coupling control system for a vehicle trailer hitch assembly having a hitch plate in which a throat is defined for receiving a trailer kingpin and having a locking mechanism for locking the kingpin in the throat, said electronic coupling control system comprising:

a hitch plate movement sensor for sensing movement of said hitch plate;

a kingpin sensor for sensing the position of said kingpin relative to said throat;

a lock sensor for sensing the position of said locking mechanism;

indicator means located in the vehicle for providing hitch coupling status information to an operator of the vehicle; and a control circuit coupled to said indicator means and coupled to said hitch plate movement sensor for determining whether said hitch plate is moved from a resting position and for activating said indicator means to inform the operator when said hitch plate is moved from a resting position, said control circuit is also coupled to said kingpin sensor for determining whether said kingpin is positioned in said throat and for activating said indicator means to inform the operator when said kingpin is positioned in said throat, said control circuit is further coupled to said lock sensor for determining whether said locking mechanism is in a locked position and for activating said indicator means to inform the operator when said locking mechanism is in a locked position.

6. The electronic coupling control system as defined in claim 5, wherein said indicator means includes:

a first indicator light that is illuminated by said control circuit when a trailer is detected in proximity to said hitch assembly;

a second indicator light that is illuminated by said control circuit when said kingpin is detected in said throat; and a third indicator light is illuminated by said control circuit when said locking mechanism is detected in a locked position.

7. An electronic coupling control system for a trailer hitch assembly to be located on a vehicle having an electrical control system for controlling a vehicle function in response to a control signal applied to a control input thereof, the trailer hitch assembly having a throat for receiving a trailer kingpin and having a locking mechanism for locking the kingpin in the throat, said electronic coupling control system comprising:

a lock sensor for sensing when said locking mechanism is in a locked position;

an interface for coupling to a control input of said vehicle electrical control system;

a control circuit coupled to said lock sensor and to said interface for generating and providing a control signal to said vehicle electrical control system when said locking mechanism is not in a locked position such that a vehicle function is affected;

a trailer proximity sensor coupled to said control circuit for sensing when a trailer is in proximity to said hitch assembly; and an indicator coupled to said control circuit for providing a continuous indication to an operator to inform the operator that the trailer is properly coupled so long as the locking mechanism remains in the locked position.

8. The electronic coupling control system as defined in claim 7, wherein said hitch assembly includes a hitch plate that moves from a resting position prior to coupling to a trailer, and wherein said trailer proximity sensor is a hitch plate movement sensor for detecting when said hitch plate is moved from a resting position.

9. The electronic coupling control system as defined in claim 7, wherein said control circuit generates and provides said control signal to said vehicle electrical control system during a time period beginning when and ending when said trailer proximity sensor detects the proximity of a trailer to said hitch assembly and said locking mechanism is not in a locked position.

10. An electronic coupling control system for a trailer hitch assembly to be located on a vehicle, the trailer hitch assembly having a throat for receiving a trailer kingpin and having a locking mechanism for locking the kingpin in the throat, said electronic coupling control system comprising:

a lock sensor for sensing when said locking mechanism is in a locked position;

an indicator located in the vehicle for providing hitch coupling status information to an operator of the vehicle; and a control circuit coupled to said lock sensor and to said lock sensor for activating said indicator means to inform the operator when said locking mechanism is in a locked position;

a power supply circuit for coupling to the ignition of the vehicle; and a diagnostic circuit coupled to said control circuit and to said power supply circuit, for performing a diagnostic routine to insure proper operation of said lock sensor, said indicator means, and said control circuit when the vehicle ignition is turned ON.

11. The electronic coupling control system as defined in claim 10, wherein said diagnostic circuit is coupled to said control circuit so as to receive an output signal from said lock sensor and to receive an output of said control circuit such that said diagnostic circuit may isolate a detected failure and identify whether said lock sensor or said control circuit has caused the failure.

12. The electronic coupling control system as defined in claim 10 and further including:

a trailer proximity sensor for sensing when a trailer is in proximity to said hitch assembly; and a kingpin sensor for sensing the presence of said kingpin in said throat, wherein said control circuit is coupled to said trailer proximity sensor for informing the operator when the trailer is in proximity to said hitch assembly, and is is also coupled to said kingpin sensor for informing the operator when said kingpin is positioned in said throat, and wherein said indicator includes a first indicator light that is illuminated by said control circuit when a trailer is detected in proximity to said hitch assembly, a second indicator light that is illuminated by said control circuit when said kingpin is detected in said throat, a third indicator light that is illuminated by said control circuit when said locking mechanism is detected in a locked position, and a fourth indicator light coupled to said diagnostic circuit that is illuminated by said diagnostic circuit when a failure is detected.

13. The electronic coupling control system as defined in claim 12, wherein said diagnostic circuit is coupled to said control circuit so as to receive output signals from each of said trailer proximity sensor, said kingpin sensor, and said lock sensor and to receive an output of said control circuit such that said diagnostic circuit may isolate a detected failure and identify which of said sensors or said control circuit has caused the failure.

14. The electronic coupling control system as defined in claim 13, wherein said control circuit includes a plurality of sensor amplifier circuits each associated with one of said trailer proximity sensor, said kingpin sensor, and said lock sensor, and wherein said diagnostic circuit is coupled to each of said sensor amplifier circuits so as to separately enable said sensor amplifier circuits to isolate and identify which, if any, of said sensor amplifier sensor circuits is causing a failure.

15. The electronic coupling control system as defined in claim 14, wherein said diagnostic circuit stops said diagnostic routine upon detecting a failure such that the lighting sequence and status of said indicator lights informs a technician where a failure has occurred.

16. The electronic coupling control system as defined in claim 15, wherein said diagnostic circuit includes a window detector for detecting whether the voltage levels of an output signal from said lock sensor and from said control circuit are within a predetermined range whereby said window detector generates a fault detection signal when the voltage levels of an output signal from said lock sensor and from said control circuit are not within said predetermined range.

17. An electronic coupling control system for a vehicle trailer hitch assembly having a hitch plate in which a throat is defined for receiving a trailer kingpin and having a locking mechanism for locking the kingpin in the throat, said electronic coupling control system comprising:

a trailer proximity sensor for sensing when a trailer is in proximity to said hitch assembly;

a kingpin sensor for sensing the presence of said kingpin in said hitch throat;

a lock sensor for sensing when said locking mechanism is in a locked position; and indicator means located in the vehicle for providing hitch coupling status information to an operator of the vehicle, said indicator means is coupled to said trailer proximity sensor for informing the operator when the trailer is in proximity to said hitch assembly, said indicator means is also coupled to said kingpin sensor for informing the operator when said kingpin is positioned in said throat, said indicator means is further coupled to said lock sensor for informing the operator when said locking mechanism is in a locked position.

18. The electronic coupling control system as defined in claim 17, wherein said indicator means includes an indicator light and control circuit coupled between said indicator light and said trailer proximity, kingpin, and lock sensors.

19. The electronic coupling control system as defined in claim 18 and further including an interface for coupling to a control input of an electrical control system of the vehicle, wherein said control circuit is coupled to said interface for generating and providing a control signal to said vehicle electrical control system when a trailer is in proximity to said hitch assembly and said locking mechanism is not in a locked position such that a vehicle function is affected.

20. The electronic coupling control system as defined in claim 18 and further including a diagnostic circuit coupled to said control circuit for performing a diagnostic routine to insure proper operation of said trailer proximity, kingpin, and lock sensors, said indicator light, and said control circuit when the vehicle ignition is turned ON.

21. The electronic coupling control system as defined in claim 17, wherein said trailer proximity sensor is a hitch plate movement sensor for detecting when said hitch plate is moved from an at-rest position.

22. The electronic coupling control system as defined in claim 21, wherein said indicator means includes:

a control circuit coupled to said trailer proximity, kingpin, and lock sensors; and a first indicator light that is illuminated by said control circuit when a trailer is detected in proximity to said hitch assembly;

a second indicator light that is illuminated by said control circuit when said kingpin is detected in said throat; and a third indicator light that is illuminated by said control circuit when said locking mechanism is detected in a locked position.

* * * * *